(12) United States Patent
Ono et al.

(10) Patent No.: US 11,930,262 B2
(45) Date of Patent: Mar. 12, 2024

(54) THREE-DIMENSIONAL SHAPE DETECTION DEVICE, THREE-DIMENSIONAL SHAPE DETECTION METHOD, AND THREE-DIMENSIONAL SHAPE DETECTION PROGRAM

(71) Applicant: CANON MACHINERY INC., Shiga (JP)

(72) Inventors: Hiroyuki Ono, Shiga (JP); Tsuyoshi Nakamura, Shiga (JP)

(73) Assignee: CANON MACHINERY INC., Shiga (JP)

( * ) Notice: Subject to any disclaimer, the term of this patent is extended or adjusted under 35 U.S.C. 154(b) by 316 days.

(21) Appl. No.: 17/430,965

(22) PCT Filed: Feb. 27, 2020

(86) PCT No.: PCT/JP2020/007897
§ 371 (c)(1),
(2) Date: Aug. 13, 2021

(87) PCT Pub. No.: WO2020/175596
PCT Pub. Date: Sep. 3, 2020

(65) Prior Publication Data
US 2022/0014656 A1    Jan. 13, 2022

(30) Foreign Application Priority Data
Feb. 27, 2019    (JP) .................... 2019-034498

(51) Int. Cl.
*H04N 23/56* (2023.01)
(52) U.S. Cl.
CPC .................... *H04N 23/56* (2023.01)
(58) Field of Classification Search
CPC ....... H04N 23/56; H04N 13/268; G01B 11/24
See application file for complete search history.

(56) References Cited

U.S. PATENT DOCUMENTS

| 2010/0188486 A1 | 7/2010 | Amanullah et al. |
| 2013/0155415 A1 | 6/2013 | Nishikawa |
| 2020/0050834 A1* | 2/2020 | Niskanen ................ G06F 18/22 |

FOREIGN PATENT DOCUMENTS

| JP | 2960684 | 10/1999 | |
| JP | 2004259968 A | * 9/2004 | ............. H01L 24/78 |

(Continued)

OTHER PUBLICATIONS

International Preliminary Report on Patentability and Written Opinion of the International Searching Authority dated Aug. 25, 2021 in International (PCT) Application No. PCT/JP2020/007897.

(Continued)

*Primary Examiner* — Ahmed A Berhan
(74) *Attorney, Agent, or Firm* — Wenderoth, Lind & Ponack, L.L.P.

(57) ABSTRACT

A photographing scenario generator is configured to generate a photographing scenario being a condition for photographing a workpiece based on a condition set in advance. The illumination adjuster is configured to switch, with an illumination condition of the photographing unit being set to be variable, the illumination condition to each of a plurality of illumination conditions during one-time relative approach or retreat between a photographing part and the workpiece. The omnifocal image creator is configured to create, for each illumination condition, an omnifocal image obtained by evaluating a focus for each local area based on a plurality of pieces of image data having different focal points, which have been acquired through photographing under the same illumination condition, and reconstructing the image data from a combination of in-focus local images.

20 Claims, 3 Drawing Sheets

(56) References Cited

FOREIGN PATENT DOCUMENTS

| | | |
|---|---|---|
| JP | 4745489 | 8/2011 |
| JP | 2014-16358 | 1/2014 |
| JP | 2014-92490 | 5/2014 |
| WO | 2011/138874 | 11/2011 |

OTHER PUBLICATIONS

International Search Report dated Apr. 7, 2020 in International (PCT) Application No. PCT/JP2020/007897.

* cited by examiner

THREE-DIMENSIONAL SHAPE DETECTION DEVICE, THREE-DIMENSIONAL SHAPE DETECTION METHOD, AND THREE-DIMENSIONAL SHAPE DETECTION PROGRAM

TECHNICAL FIELD

The present invention relates to a three-dimensional shape detection device, a three-dimensional shape detection method, and a three-dimensional shape detection program.

BACKGROUND ART

As a method of inspecting a workpiece (for example, an electronic component having wire bonding), there is a case in which an image of the workpiece is first acquired, a three-dimensional shape of the workpiece is detected from the image, and the inspection is performed based on the three-dimensional shape. As a method of detecting a three-dimensional shape of an object, there is a method described in Patent Literature 1. In the method described in Patent Literature 1, as illustrated in FIG. 5, a photographing unit 101 formed of a camera and other parts is moved up and down by a Z-movement mechanism 102, to thereby change relative positions of a focal point of the photographing unit 101 and a workpiece W, and a surface of the workpiece W is photographed, to thereby obtain a plurality of images having different focal point positions. Then, the in-focus point position of the surface of the workpiece W is detected in each image of the plurality of images, and the in-focus point positions of the surface of the workpiece W across different focal point positions are calculated through interpolation from information on the detected in-focus point positions of the surface of the workpiece W. After that, the three-dimensional shape of the workpiece W is obtained based on the information on the in-focus point positions.

When the workpiece W is photographed by such a method as described in Patent Literature 1, it is general to use a bright-field illumination light 103, but in some cases, it is conceivable that it is preferred to use a dark-field illumination light depending on three-dimensional features of a part to be inspected and details of the inspection. Ina technology described in Patent Literature 2, there are provided a bright-field illumination light and a dark-field illumination light, and the photographing is performed by switching between the bright-field illumination light and the dark-field illumination light depending on the part to be inspected and the details of the inspection, to thereby obtain a satisfactory inspection image of an object to be inspected.

CITATION LIST

Patent Literature

Patent Literature 1: JP 2960684 B2
Patent Literature 2: JP 4745489 B2

SUMMARY OF INVENTION

Technical Problem

When a bright-field illumination light and a dark-field illumination light are provided, in a case of performing photographing under a plurality of illumination conditions, the photographing is performed under such a photographing scenario as illustrated in FIG. 6. That is, after a plurality of images are acquired while a focus is being moved (the photographing unit is being lowered) under a first illumination condition (for example, bright-field illumination), it is required to switch to a second illumination condition (for example, dark-field illumination) and acquire a plurality of images while the focus is again being moved (the photographing unit is being raised) in the reverse direction. In this manner, while the photographing unit is being raised and lowered, the photographing is being performed, and hence a workpiece cannot be moved. That is, as illustrated in FIG. 6, the workpiece is moved after a cycle of lowering and raising the photographing unit is ended. During this time period, the photographing unit is in a stationary state. Therefore, when a three-dimensional shape of the workpiece is to be detected under a plurality of illumination conditions, there arises such a problem that a detection cycle becomes longer.

It is also required to generate the photographing scenario in consideration of a moving speed of a camera and a frame rate of the camera. Therefore, there is also a problem in that a user who attempts to set a photographing scenario requires specialized knowledge and requires time to generate a photographing scenario because, for example, calculation requires time and labor.

Therefore, the present invention has been made in view of the above-mentioned circumstances, and is to provide a three-dimensional shape detection device, a three-dimensional shape detection method, and a three-dimensional shape detection program which are capable of shortening a detection cycle when a three-dimensional shape of a workpiece is to be detected based on a shape-from-focus method under a plurality of illumination conditions.

Solution to Problem

According to the present invention, there is provided a three-dimensional shape detection device comprising: a photographing unit comprising a photographing part, which is allowed to perform photographing under a plurality of illumination conditions, and is configured to acquire images of a workpiece having different focal points by relatively approaching and retreating from the workpiece; and a controller configured to control the photographing unit, and to detect a three-dimensional shape of the workpiece, wherein the controller comprises: a photographing scenario generator configured to generate a photographing scenario being a condition for photographing the workpiece based on a condition set in advance; an illumination adjuster configured to switch, with an illumination condition of the photographing unit being set to be variable, the illumination condition to each of the plurality of illumination conditions during one-time approach or retreat of the photographing part; and an omnifocal image creator configured to create, for each illumination condition, an omnifocal image obtained by evaluating a focus for each local area based on a plurality of pieces of image data having different focal points, which have been acquired through photographing under the same illumination condition, and reconstructing the image data from a combination of in-focus local images.

With the three-dimensional shape detection device according to the present invention, the workpiece is photographed under a plurality of illumination conditions while the photographing part is relatively approaching or retreating from the workpiece one time, and hence it is possible to form an omnifocal image under a plurality of kinds of illumination conditions during one-time approach or retreat to/from the workpiece. Thus, information required for detecting the three-dimensional shape of the workpiece can be obtained by the one-time approach or retreat to/from the workpiece, and a subsequent workpiece to be detected can be moved to a detection position while the photographing part is being moved with respect to the workpiece in a direction reverse to that at the time of photographing.

The photographing scenario may be obtained by setting a relative approaching or retreating speed between the photographing part and the workpiece, the illumination condition of the photographing unit, a photographing timing, and a number of images to be acquired through photographing.

In the above-mentioned configuration, the photographing scenario may be obtained by setting a relative approaching or retreating speed between the photographing part and the workpiece, the illumination condition of the photographing unit, a photographing timing, and a number of images to be acquired through photographing.

In the above-mentioned configuration, the photographing unit may comprise a bright-field illumination light and a dark-field illumination light. Thus, it is easy to detect the three-dimensional shape by the bright-field illumination light in a flat surface portion, and it is easy to detect the three-dimensional shape by the dark-field illumination light in a slope portion. Therefore, even when the workpiece has the flat surface portion and the slope portion, it is possible to accurately detect three-dimensional shapes of the flat surface portion and the slope portion, to thereby increase detection accuracy.

In the above-mentioned configuration, the photographing scenario generator of the controller may be configured to generate the photographing scenario based on an upper limit of a moving speed of the photographing unit and an upper limit of a frame rate of the photographing unit.

In the above-mentioned configuration, the condition set in advance may be any one of a moving range of the photographing part, a photographing pitch of the photographing part, and the plurality of illumination conditions.

In the above-mentioned configuration, the three-dimensional shape detection device is particularly effective when the workpiece comprises an electronic component comprising a bonding wire.

According to the present invention, there is provided a three-dimensional shape detection method comprising: acquiring, by a photographing part configured to photograph a workpiece, images of the workpiece having different focal points by relatively approaching and retreating from the workpiece under a plurality of illumination conditions; and detecting a three-dimensional shape of the workpiece based on the images, wherein the three-dimensional shape detection method further comprises: generating a photographing scenario being a condition for photographing the workpiece based on a condition set in advance; photographing the workpiece a plurality of times by switching the illumination condition to each of the plurality of illumination conditions during one-time relative approach or retreat between the photographing part and the workpiece; and creating, for each illumination condition, an omnifocal image obtained by evaluating a focus for each local area based on a plurality of pieces of image data having different focal points, which have been acquired through photographing under the same illumination condition, and reconstructing the image data from a combination of in-focus local images.

In the above-mentioned configuration, the three-dimensional shape detection method may further comprise: photographing the workpiece a plurality of times during the relative approach or retreat between the photographing part and the workpiece; and moving a subsequent workpiece to be detected to a detection position and creating an omnifocal image during a period in which the photographing part and the workpiece are being relatively moved in a direction reverse to a direction of the relative approach or retreat.

According to the present invention, there is provided a three-dimensional shape detection program for causing a photographing part configured to photograph a workpiece to execute: acquiring images of the workpiece having different focal points by relatively approaching and retreating from the workpiece under a plurality of illumination conditions; and detecting a three-dimensional shape of the workpiece based on the images, wherein the three-dimensional shape detection program comprises the steps of: generating a photographing scenario being a condition for photographing the workpiece based on a condition set in advance; photographing the workpiece a plurality of times by switching the illumination condition to each of the plurality of illumination conditions during one-time relative approach or retreat between the photographing part and the workpiece; and creating, for each illumination condition, an omnifocal image obtained by evaluating a focus for each local area based on a plurality of pieces of image data having different focal points, which have been acquired through photographing under the same illumination condition, and reconstructing the image data from a combination of in-focus local images.

Advantageous Effects of Invention

With the three-dimensional shape detection device, the three-dimensional shape detection method, and the three-dimensional shape detection program according to the present invention, the information required for detecting the three-dimensional shape of the workpiece can be obtained by causing the photographing part to approach or retreat to/from the workpiece one time, and the subsequent workpiece to be detected can be moved to the detection position while the photographing part is being moved with respect to the workpiece in the direction reverse to that at the time of the photographing. As a result, it is possible to shorten the detection cycle when the three-dimensional shape of the workpiece is to be detected based on the shape-from-focus method under a plurality of illumination conditions.

DESCRIPTION OF EMBODIMENTS

Now, embodiments of the present invention are described with reference to FIG. 1 to FIG. 4.

A three-dimensional shape detection device according to the present invention is configured to three-dimensionally detect a shape of a workpiece. In this embodiment, the workpiece is an electronic component comprising a bonding wire, and more specifically, is provided with a bonding pad on a chip provided on a substrate main body with one end portion of the wire joined to the bonding pad and the other end portion of the wire joined to a land portion on the substrate main body. In addition, a large number of such workpieces are arrayed on the substrate main body.

Figure 1:
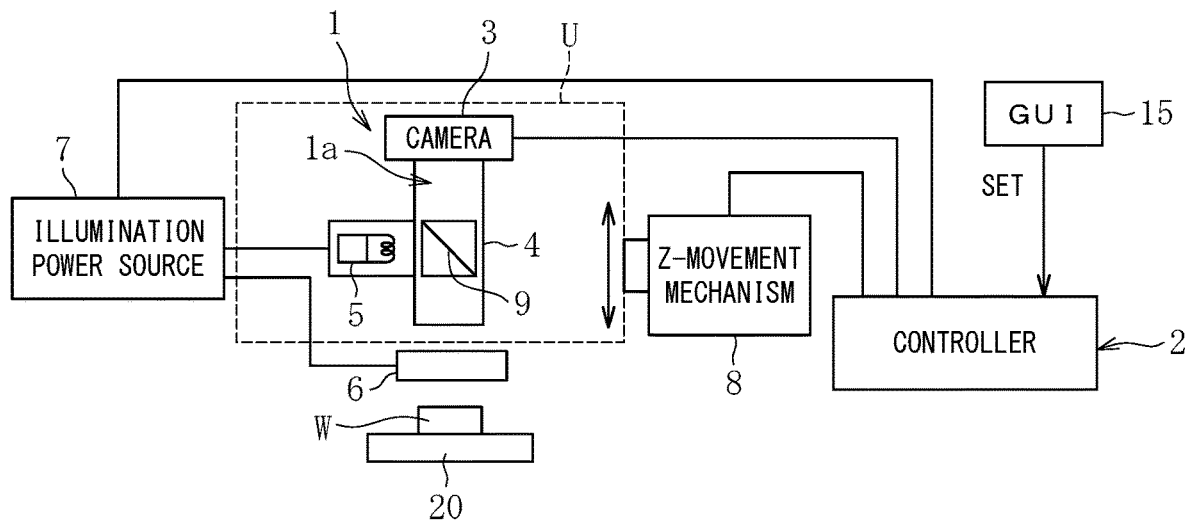
FIG. 1 is a block diagram for illustrating a three-dimensional shape detection device according to the present invention.

As illustrated in FIG. 1, the three-dimensional shape detection device according to the present invention is formed of a photographing unit 1 and a controller 2 (controller).

The photographing unit 1 comprises a camera 3, a lens 4, a bright-field illumination light 5, a dark-field illumination light 6, and an illumination power source 7. The camera 3 is formed of, for example, a CCD camera, and the lens 4 is directed downward, to thereby acquire image data on a workpiece W being an object to be photographed. The camera 3 and the lens 4 serve as a photographing part 1a configured to acquire an image of the workpiece W. The camera 3 is electrically connected to the controller 2, and the image data on the workpiece W acquired by the camera 3 is taken into the controller 2 to be subjected to image processing.

The camera 3 is supported by a frame (not shown), and a moving unit U (part surrounded by the dotted line in FIG. 1) comprising the camera 3, the lens 4, and the bright-field illumination light 5 can be reciprocated in a direction for relatively approaching and retreating from the workpiece W (in this embodiment, a Z-direction (up-and-down direction)) by a Z-movement mechanism 8 as indicated by the arrow of FIG. 1. That is, in this embodiment, the photographing part 1a and the bright-field illumination light 5 are moved up and down. The Z-movement mechanism 8 can be formed of any one of various mechanisms, for example, a cylinder mechanism, a ball screw mechanism, or a linear motor mechanism. The Z-movement mechanism 8 is electrically connected to the controller 2, and the Z-movement mechanism 8 is driven by control of the controller 2. Thus, when the workpiece W is photographed while the photographing part 1a is being moved up and down, a plurality of images of the workpiece W having different focal points can be acquired.

In this embodiment, as illustrated in FIG. 1, an illumination unit comprises the bright-field illumination light 5 and the dark-field illumination light 6. The bright-field illumination refers to illuminating an object to be measured with a light beam that illuminates the object to be measured vertically along an optical axis center. The dark-field illumination refers to illuminating the object to be measured with the light beam that illuminates the object to be measured not along the optical axis center but at an angle. That is, in general, the bright field is used for observing direct light, and an illumination method in that case is called "direct-light illumination method," in which a normal portion is brightly observed in a flat surface portion, for example, on a chip surface. Meanwhile, the dark field is used for observing scattered light, and an illumination method in that case is called "scattered-light illumination method," in which a slope portion, for example, a bonding wire is brightly observed.

The bright-field illumination light 5 in this embodiment has a so-called coaxial illumination structure incorporated into an optical path of the lens 4. That is, irradiation light emitted from the bright-field illumination light 5 (light source) is reflected by a built-in half mirror 9 of the lens 4 to reach the workpiece W, and the light reflected from the workpiece W reaches the camera 3. The bright-field illumination light 5 is electrically connected to the controller 2 through intermediation of the illumination power source 7, and when the illumination power source 7 is switched by the control of the controller 2, it is possible to control turning on and off of the bright-field illumination light 5, and to change an intensity of the irradiation light emitted from the bright-field illumination light 5.

The dark-field illumination light 6 is capable of irradiating the workpiece W at an angle. For example, the dark-field illumination light 6 can be formed of a so-called ring illumination in which a plurality of light emitters are arranged in a circumferential direction at a predetermined pitch (which may be a regular pitch or an irregular pitch), or formed of a single light emitter arranged so that an angle (elevation angle) formed by the workpiece W and an illumination axis is a predetermined angle when a photographing axis and the workpiece W are arranged so as to be orthogonal to each other. The dark-field illumination light 6 is electrically connected to the controller 2 through intermediation of the illumination power source 7, and when the illumination power source 7 is switched by the control of the controller 2, it is possible to control turning on and off of the dark-field illumination light 6, and to change an intensity of the irradiation light emitted from the dark-field illumination light 6.

The illumination power supply 7 has a plurality of channels, and is capable of controlling the turning on and off of any one of the bright-field illumination light 5 and the dark-field illumination light 6 by control of an illumination adjuster 11 illustrated in FIG. 2 of the controller 2, which is described later, and of individually changing a brightness (illumination light intensity) of the bright-field illumination light 5 and a brightness (illumination light intensity) of the dark-field illumination light 6.

The workpiece W is placed on a table 20 arranged below the dark-field illumination light 6. The table 20 can be moved in a horizontal direction by a driver (not shown). Thus, the workpiece W can be moved to adjust the photographing position. In addition, when the table 20 can be moved in an up-and-down direction, it is possible to change a focal point position without moving a position of the photographing part 1a (without moving the position up and down) by moving the table 20 up and down.

The controller 2 can be formed of, for example, a microcomputer in which a read only memory (ROM), a random access memory (RAM), and the like are connected to each other through buses with a central processing unit (CPU) being the center. A storage device is connected to the microcomputer. The storage device can be formed of a hard disc drive (HDD), a digital versatile disk (DVD) drive, a compact disc-recordable (CD-R) drive, an electronically erasable and programmable read only memory (EEPROM), or the like. A program to be executed by the CPU and data are stored in the ROM.

Figure 2:
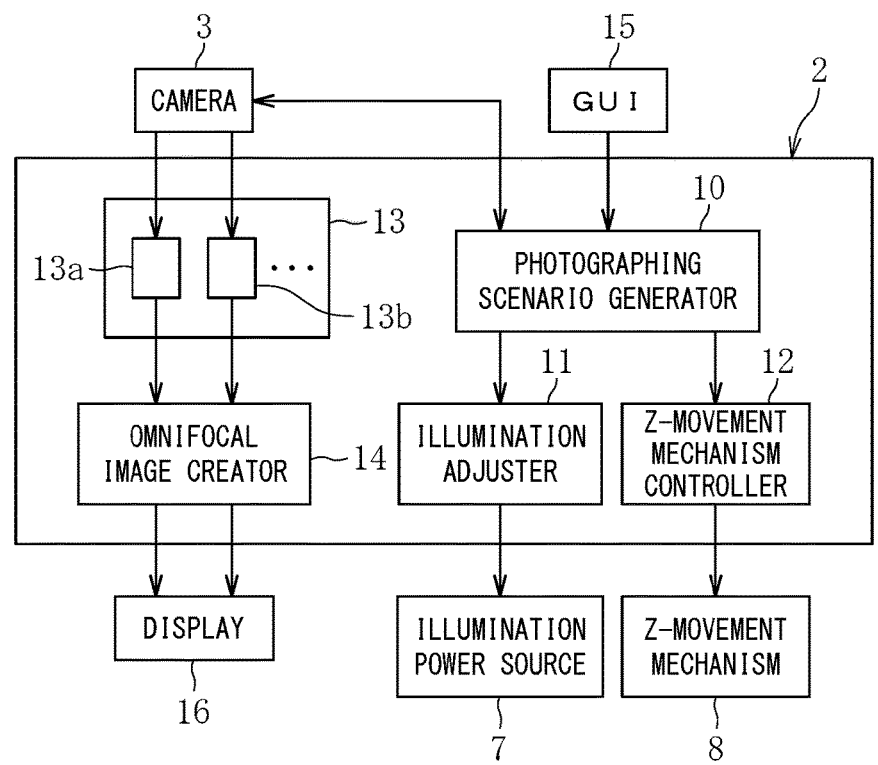
FIG. 2 is a block diagram of a controller forming the three-dimensional shape detection device according to the present invention.

As illustrated in FIG. 2, the controller 2 comprises a photographing scenario generator 10, the illumination adjuster 11, a Z-movement mechanism controller 12, a memory 13, and an omnifocal image creator 14. The photographing scenario generator 10 is configured to generate a photographing scenario based on conditions set in advance. The "photographing scenario" refers to conditions for photographing the workpiece W, and more specifically, to conditions in which an approaching or retreating speed of the photographing part 1a with respect to the workpiece W, an illumination condition of the photographing unit 1, a photographing timing, and the number of images to be acquired through photographing are set. The "conditions set in advance" are any one or all of a moving range of the photographing part 1$a$, the photographing pitch (distance spacing for performing the photographing) of the photographing part 1$a$, and a plurality of illumination conditions, and are set by the user. In addition, in this embodiment, the "plurality of illumination conditions" include two illumination conditions, namely, a first illumination condition and a second illumination condition, and it is assumed that the first illumination condition is bright-field illumination and the second illumination condition is the dark-field illumination.

That is, the user sets the moving range of the photographing part 1$a$, the photographing pitch of the photographing part 1$a$, and the plurality of illumination conditions through use of a graphical user interface (GUI) 15 (interface configured to connect a computer and a user to each other and display information and allows an operation to be performed, and comprises a screen configured to display thereon, for example, windows, icons, and buttons). Those are freely set by the user in consideration of, for example, a type of the workpiece W, inspection accuracy required for inspecting the workpiece W, and performance of the camera 3 and the lens 4. From those conditions set by the user, the photographing scenario generator 10 generates a photographing scenario for photographing the workpiece W. Specifically, the photographing scenario generator 10 has information on an upper limit of a moving speed of the photographing part 1$a$ and an upper limit of a frame rate (number of images that can be output by the camera 3 for one second) of the camera 3. From those pieces of information and the conditions supplied by the user, the photographing scenario generator 10 determines through calculation the approaching or retreating speed of the photographing part 1$a$ with respect to the workpiece W, the illumination condition of the photographing unit 1, and the number of images to be acquired through photographing. The photographing scenario generator 10 can calculate the frame rate from setting of a photographing field of view of the camera 3. That is, when the photographing field of view is narrow, the frame rate increases due to a small amount of data to be transferred, and when the photographing field of view is wide, the frame rate decreases due to a large amount of data to be transferred. Therefore, the photographing scenario generator 10 can also perform those kinds of calculation based on the photographing field of view of the camera 3.

As described above, the photographing scenario is determined through calculation from the conditions supplied by the user, the upper limit of the moving speed of the photographing part 1$a$, and the upper limit of the frame rate of the camera 3. That is, during the photographing, it depends on the setting supplied by the user which one of the moving speed of the photographing part 1$a$ and the frame rate of the camera 3 is lower in capacity and is to restrict a capacity and speed of the photographing. For example, when images are frequently acquired at a fine photographing pitch, the photographing is performed with the upper limit of the frame rate of the camera 3 (maximum speed at which the camera 3 can perform photographing) while the moving speed of the photographing part 1$a$ (namely, capacity of the Z-movement mechanism 8) has not reached the upper limit (has a margin for a further increase). That is, in this case, the upper limit of the frame rate becomes dominant over the capacity and speed of the photographing. Meanwhile, when a small number of images are acquired with a coarse photographing pitch, the moving speed of the photographing part 1$a$ reaches the upper limit (maximum capacity that can be output by the Z-movement mechanism 8) while the frame rate of the camera 3 has not reached the upper limit (has a margin for a capacity to perform photographing at a higher speed). That is, in this case, the upper limit of the moving speed of the photographing part 1$a$ becomes dominant over the capacity and speed of the photographing.

Figure 3:
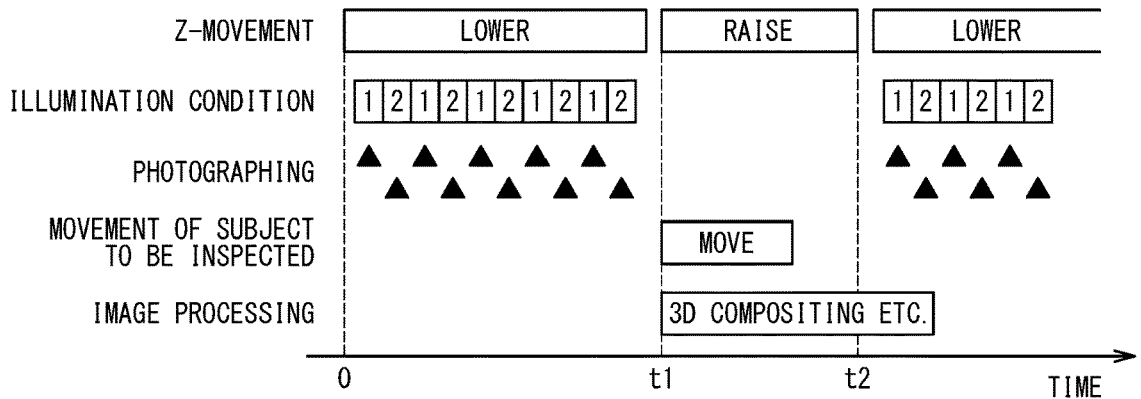
FIG. 3 is a diagram for illustrating an example of a photographing scenario created by the controller of the three-dimensional shape detection device according to the present invention.

In this embodiment, the photographing scenario is exemplified in FIG. 3. In the photographing scenario of FIG. 3, the photographing part 1$a$ in the Z-direction is lowered at a moving speed of "(moving range of the photographing part 1$a$)/t1", and is raised at a moving speed of "(moving range of the photographing part 1$a$)/(t2−t1)". The moving range of the photographing part 1$a$ is supplied by the user. The illumination condition is formed of two kinds of conditions, namely, the first illumination condition being bright-field illumination and the second illumination condition being the dark-field illumination, and is setting supplied by the user. The photographing timing is to photograph the workpiece W at a timing at which the photographing part 1$a$ is lowered, and the camera 3 acquires the image data for each time period (t1/10) while the photographing part 1$a$ is being lowered based on the distance spacing (photographing pitch) for the photographing supplied by the user. The number of images to be acquired through photographing is ten in total, five each under the first illumination condition and the second illumination condition.

The illumination adjuster 11 is configured to control the illumination power source 7, and to switch, with the illumination condition of the photographing unit 1 being set to be variable, the illumination condition to each of a plurality of illumination conditions during the one-time approach or retreat to/from the workpiece W. That is, the illumination adjuster 11 controls illumination power source 7 so as to alternately switch between the first illumination condition and the second illumination condition based on the photographing scenario generated by the photographing scenario generator 10. In this case, the turning on and off of the bright-field illumination light 5 and the dark-field illumination light 6 may be controlled, but in this embodiment, intensities of the bright-field illumination light 5 and the dark-field illumination light 6 are controlled individually. Thus, the first illumination condition and the second illumination condition can be switched at high speed.

The Z-movement mechanism controller 12 is configured to control the Z-movement mechanism 8. That is, the Z-movement mechanism controller 12 controls, based on the photographing scenario generated by the photographing scenario generator 10, the Z-movement mechanism 8 to move the photographing part 1$a$ at the speed of the photographing scenario. Specifically, when the photographing scenario illustrated in FIG. 3 is generated, the Z-movement mechanism controller 12 controls the Z-movement mechanism 8 to move the photographing part 1$a$ at the speed of "(moving range of the photographing part 1$a$)/t1" when the photographing part 1$a$ is lowered, and controls the Z-movement mechanism 8 to move the photographing part 1$a$ at the speed of "(moving range of the photographing part 1$a$)/(t2−t1)" when the photographing part 1$a$ is raised.

The memory 13 is configured to store the image data acquired by the camera 3. The memory 13 comprises a plurality of storage units (first part 13$a$, second part 13$b$, . . . ), in each of which the image data acquired under the same illumination condition is stored. For example, in this embodiment, only the image data acquired through photographing under the first illumination condition is stored in the first part 13$a$, and only the image data acquired through photographing under the second illumination condition is stored in the second part 13b. In this manner, the image data is stored under a state of being grouped for each illumination condition.

The omnifocal image creator 14 is configured to perform processing by a so-called shape-from-focus method, and to create an omnifocal image based on a plurality of pieces of image data having different focal points. In this case, the omnifocal image creator 14 creates an omnifocal image for each illumination condition. The omnifocal image refers to an image obtained by evaluating a focus (detecting an in-focus position) for each local area based on a plurality of pieces of image data having different focal points and reconstructing the image data from a combination of in-focus local images, and all pixels of the omnifocal image are in focus. The omnifocal image is created for each same illumination condition. That is, in this embodiment, a first omnifocal image and a second omnifocal image are created. The first omnifocal image is created from a plurality of pieces of image data having different focal points, which are obtained through photographing under the first illumination condition, and the second omnifocal image is created from a plurality of pieces of image data having different focal points, which are obtained through photographing under the second illumination condition. Those omnifocal images are displayed on a display 16.

In addition, the controller 2 may be provided with an inspection part (not shown), and may be configured to enable determination of whether quality of the workpiece W is satisfactory based on each of the omnifocal images.

The three-dimensional shape detection device according to this embodiment can be achieved by installing a three-dimensional shape detection program in a computer. The three-dimensional shape detection program causes the photographing part 1a configured to photograph the workpiece W to execute: acquiring images of the workpiece W having different focal points by relatively approaching and retreating from the workpiece W under a plurality of illumination conditions; and detecting a three-dimensional shape of the workpiece W based on the images, wherein the three-dimensional shape detection program comprises the steps of: generating a photographing scenario being a condition for photographing the workpiece W based on a condition set in advance; photographing the workpiece W a plurality of times by switching the illumination condition to each of the plurality of illumination conditions during one-time relative approach or retreat between the photographing part 1a and the workpiece W; and creating, for each illumination condition, an omnifocal image obtained by evaluating a focus for each local area based on a plurality of pieces of image data having different focal points, which have been acquired through photographing under the same illumination condition, and reconstructing the image data from a combination of in-focus local images.

Figure 4:
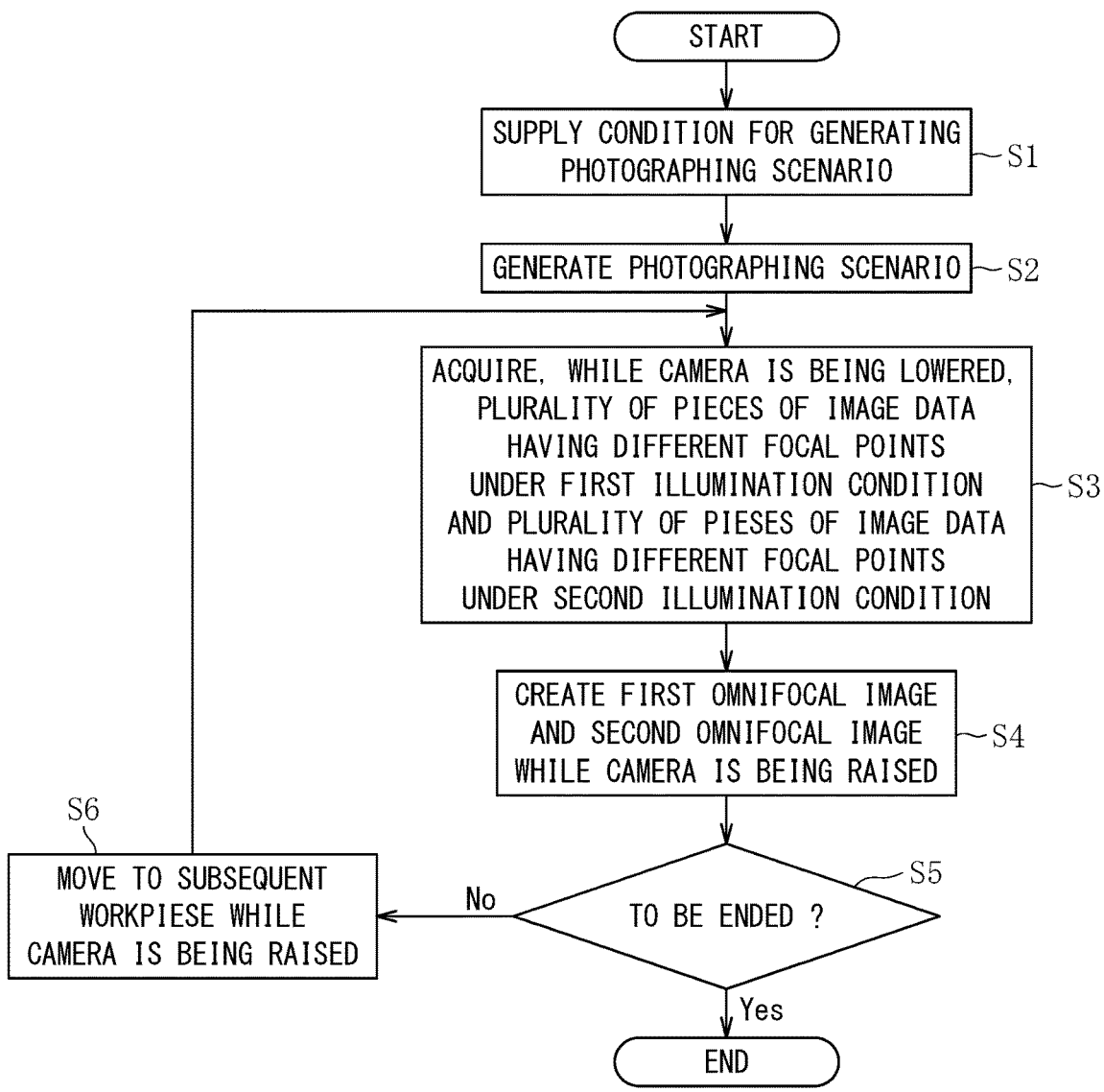
FIG. 4 is a flow chart for illustrating a procedure of a three-dimensional shape detection method according to the present invention.
Figure 5:
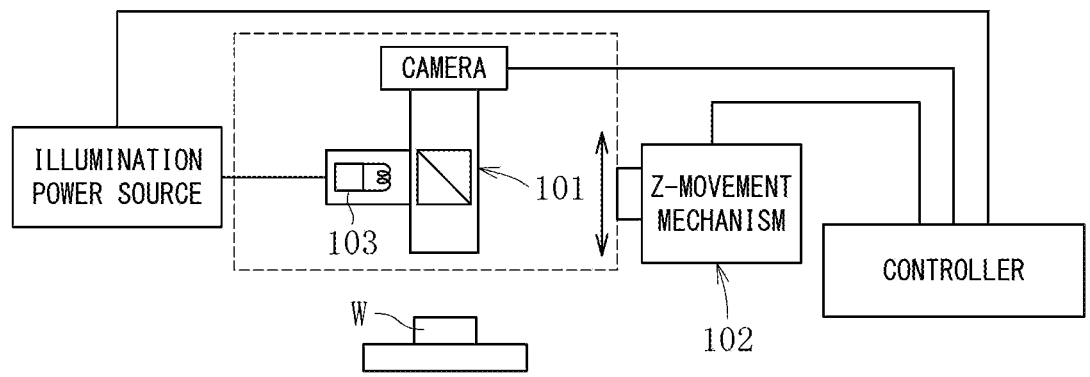
FIG. 5 is a block diagram for illustrating a related-art three-dimensional shape detection device.
Figure 6:
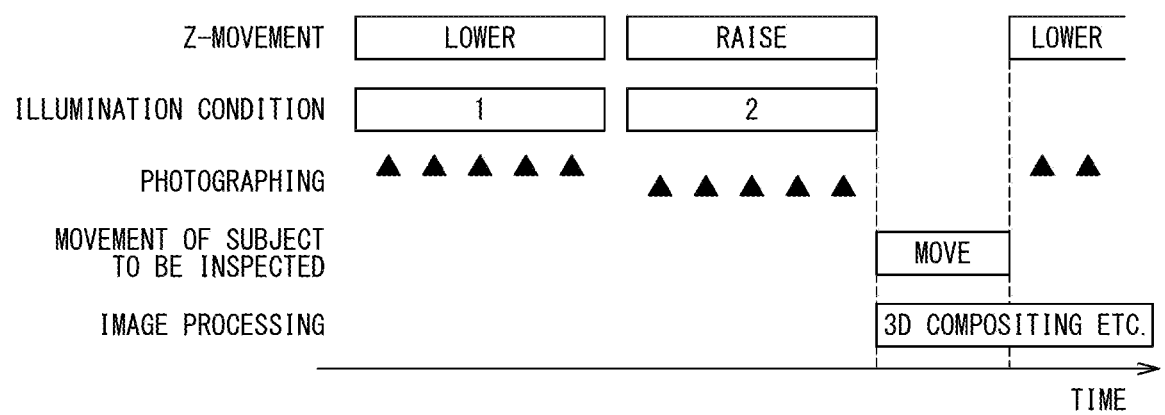
FIG. 6 is a diagram for illustrating an example of a photographing scenario used in a related-art three-dimensional shape detection method.

A method of detecting a three-dimensional shape of the workpiece W (in this embodiment, an electronic component having a bonding wire) through use of the three-dimensional shape detection device according to this embodiment having installed the three-dimensional shape detection program thereon is described with reference to FIG. 4.

The user supplies conditions for generating a photographing scenario from the GUI 15 based on, for example, the type of the workpiece W, the inspection accuracy required for inspecting the workpiece W, and the performance of the camera 3 and the lens 4 (Step S1). In this embodiment, the conditions set by the user are the moving range of the photographing part 1a, the photographing pitch (distance spacing for performing the photographing) of the photographing part 1a, and the plurality of illumination conditions. In this embodiment, the illumination condition is assumed to have two kinds of conditions, namely, the bright-field illumination being the first illumination condition and the dark-field illumination being the second illumination condition.

From those conditions set by the user, the photographing scenario generator 10 generates a photographing scenario for photographing the workpiece W as illustrated in FIG. 3 (Step S2). Specifically, the photographing scenario generator 10 determines through calculation, from information on the upper limit of the moving speed of the photographing part 1a and the upper limit of the frame rate of the camera 3 and the conditions supplied by the user, the approaching or retreating speed of the photographing part 1a with respect to the workpiece W, the illumination condition of the photographing unit 1, and the number of images to be acquired through photographing.

Based on the generated photographing scenario, the Z-movement mechanism controller 12 controls the Z-movement mechanism 8 to move the photographing part 1a at the speed of "(moving range of the photographing part 1a)/t1" when the photographing part 1a is lowered, and controls the Z-movement mechanism 8 to move the photographing part 1a at the speed of "(moving range of the photographing part 1a)/(t2−t1)" when the photographing part 1a is raised.

In this case, the camera 3 acquires the image data for each time period (t1/10) while the camera 3 is approaching (being lowered to) the workpiece one time. At that time, the illumination power source 7 is controlled by the illumination adjuster 11 to control an intensity of the illumination, to thereby alternately switch between the first illumination condition (bright-field illumination) and the second illumination condition (dark-field illumination) for each time of photographing. Thus, a plurality of pieces of image data (five images in this embodiment) having different focal points under the first illumination condition are acquired, and a plurality of pieces of image data (five images in this embodiment) having different focal points under the second illumination condition are acquired (Step S3). The image data acquired through photographing under the first illumination condition is stored in the first part 13a of the memory 13, and the image data acquired through photographing under the second illumination condition is stored in the second part 13b of the memory 13.

Subsequently, during the retreat (rising) from the workpiece W, the omnifocal image creator 14 performs 3D compositing processing for creating a first omnifocal image from a plurality of pieces of image data having different focal points through the photographing under the first illumination condition and a second omnifocal image from a plurality of pieces of image data having different focal points through the photographing under the second illumination condition (Step S4). Those omnifocal images are displayed on the display 16. At this time, the controller 2 may determine whether the quality of the workpiece W is satisfactory based on each of the omnifocal images.

When there is another workpiece W having a three-dimensional shape to be detected (Step S5), the subsequent workpiece W to be detected is moved to a detection position (position below the lens 4) while the photographing part 1a is being raised, that is, while the controller 2 is performing the 3D compositing or another processing (Step S6), and Step S3 and Step S4 are executed for the next workpiece W as well.

With the three-dimensional shape detection device, the three-dimensional shape detection method, and the three-dimensional shape detection program according to the present invention, the workpiece W is photographed under a plurality of illumination conditions while the photographing part 1a approaches the workpiece W one time, and hence it is possible to form omnifocal images under a plurality of kinds (two kinds in this embodiment) of illumination conditions by one-time approach to the workpiece W. That is, one-time approach to the workpiece W enables information required for detecting the three-dimensional shape of the workpiece W to be obtained, and while the photographing part 1a is being raised, it is possible to perform the image processing and move the subsequent workpiece W to be detected to the detection position. Therefore, when the three-dimensional shape of the workpiece W is detected based on the shape-from-focus method under a plurality of illumination conditions, a detection cycle can be shortened.

In the above-mentioned embodiment, the illumination condition is formed of two conditions, namely, the first illumination condition and the second illumination condition, but as a second embodiment of the present invention, three or more illumination conditions may be used. In this case, when the bright-field illumination light 5 has a plurality of intensities or the dark-field illumination light 6 has a plurality of intensities, it is possible to set as many illumination conditions as the number of different intensities of each illumination light. That is, assuming that the bright-field illumination at an illumination intensity L1 is the first illumination condition, . . . , the bright-field illumination at an illumination intensity Ln (where n is any number of 1 or more) is an n-th illumination condition (L1> . . . >Ln), the dark-field illumination at an intensity 11 is an (n+1)th illumination condition, . . . , and the dark-field illumination at an illumination intensity 1m (where m is any number of 1 or more) is an (n+m)th illumination condition (11> . . . >1m), when n or m is 2 or more (that is, any one of the bright-field illumination light and the dark-field illumination light emits light with a plurality of intensities), it is possible to set three or more illumination conditions. In this case, omnifocal images corresponding to the number of illumination conditions are formed.

As a third embodiment of the present invention, the photographing unit 1 may comprise only the bright-field illumination light 5 and may not comprise the dark-field illumination light 6. In this case, it is possible to form the plurality of illumination conditions only by the bright-field illumination light 5 by setting the bright-field illumination at the illumination intensity L1 as the first illumination condition, the bright-field illumination at the illumination intensity L2 as the second illumination condition.

As a fourth embodiment of the present invention, the photographing unit 1 may comprise only the dark-field illumination light 6 and may not comprise the bright-field illumination light 5. In this case, it is possible to form the plurality of illumination conditions only by the dark-field illumination light 6 by setting the dark-field illumination at an illumination intensity 11 as the first illumination condition, the dark-field illumination at an illumination intensity 12 as the second illumination condition.

As a fifth embodiment of the present invention, the workpiece W may be photographed while the photographing part 1a is being raised, and the image processing and the movement of the subsequent workpiece W may be performed while the photographing part 1a is being lowered. In addition, for example, when the workpiece W having a three-dimensional shape to be detected and the subsequent workpiece W to be detected are close to each other, a time period for movement to the subsequent workpiece W may be short due to a short moving distance between the workpieces W. In this case, the workpiece W may be photographed while the photographing part 1a is being lowered (raised), followed by movement to the subsequent workpiece W, and the subsequent workpiece W may be photographed when the photographing part 1a is then raised (lowered).

As a sixth embodiment of the present invention, the Z-movement mechanism controller 12 may be electrically connected to the table 20 on which the workpiece W is to be placed, and may be configured to move the focus by controlling up-and-down movement of the table 20. The Z-movement mechanism controller 12 may also be configured to control both the Z-movement mechanism 8 and the table 20.

The embodiments of the present invention have been described above, but the present invention is not limited to the above-mentioned embodiments, and various modifications can be made thereto. For example, in regard to elements that form a photographing scenario, the photographing scenario may be formed of any one of a relative approaching or retreating speed between the photographing part and the workpiece, the illumination condition of a photographing unit, the photographing timing, and the number of images to be acquired through photographing, may be formed of any two thereof or any three thereof, or may be formed of elements other than those. That is, the photographing scenario can be formed of various elements based on, for example, an environment in which the workpiece is photographed, the performance of the camera or the lens, and the type of the workpiece. As the conditions to be set in advance by the user in order to generate a photographing scenario, any one of the moving range of the photographing part, the photographing pitch of the photographing part, and the plurality of illumination conditions may be set, any two thereof may be set, all three thereof may be set, or conditions other than those may be set.

The photographing under each illumination condition is preferred to be performed at regular intervals in the Z-direction, but is not always required to be performed at regular intervals. For example, when there are two illumination conditions, it is preferred to alternately switch between an illumination condition 1 and an illumination condition 2 during the compositing of the three-dimensional shape. However, the photographing may be performed in an order of, for example, the illumination condition 1, the illumination condition 1, and the illumination condition 2 instead of the alternate order. In another case, it may be set that, for example, during one-time lowering (rising), the photographing is performed only under the illumination condition in a certain height range and is performed only under the illumination condition 2 in the other height range.

When the bright-field illumination light is provided, the bright-field illumination light may be provided outside the lens. In this case, the moving unit configured to move in the Z-direction can be formed of only the photographing part comprising the camera and the lens, and the bright-field illumination light can be configured not to move in the Z-direction.

INDUSTRIAL APPLICABILITY

The workpiece having a three-dimensional shape to be detected is not limited to an electronic component, and may be any one of various components that has a three-dimensional shape. In the case of an electronic component, the bonding wire may not be included therein, or the electronic component may have a three-dimensional shape to be detected in which, for example, chips are stacked stepwise.

REFERENCE SIGNS LIST 1 photographing unit
1a photographing part
2 controller
5 bright-field illumination light
6 dark-field illumination light
10 photographing scenario generator
11 illumination adjuster
14 omnifocal image creator
W workpiece

The invention claimed is:

1. A three-dimensional shape detection device, comprising:
a photographing unit comprising a photographing part, which is allowed to perform photographing under a plurality of illumination conditions, and is configured to acquire images of a workpiece having different focal points by relatively approaching and retreating from the workpiece with an illumination condition being set to be variable; and
a controller configured to control the photographing unit, and to detect a three-dimensional shape of the workpiece,
wherein the controller comprises:
a photographing scenario generator configured to generate a photographing scenario that is a condition for photographing the workpiece based on a condition set in advance;
an illumination adjuster configured to switch, with the illumination condition of the photographing unit being set to be variable, the illumination condition to each of the plurality of illumination conditions; and
an omnifocal image creator configured to create, under each of the illumination conditions, an omnifocal image obtained by evaluating a focus for each local area based on a plurality of pieces of image data having different focal points, which have been acquired through photographing under the same illumination condition, and performing compositing of the image data from a combination of in-focus local images, wherein
during a one-time relative approach or retreat between the photographing part and the workpiece, the illumination adjuster switches to each of the plurality of illumination conditions, and the photographing part acquires, under each of the illumination conditions, the plurality of pieces of image data having different focal points based on the photographing scenario set in the photographing scenario generator, and
the omnifocal image creator forms the omnifocal image under each of the illumination conditions.

2. The three-dimensional shape detection device according to claim 1, wherein the photographing scenario is obtained by setting a relative approaching or retreating speed between the photographing part and the workpiece, the illumination condition of the photographing unit, a photographing timing, and a number of images to be acquired through photographing.

3. The three-dimensional shape detection device according to claim 2, wherein the photographing unit comprises a bright-field illumination light and a dark-field illumination light.

4. The three-dimensional shape detection device according to claim 3, wherein the photographing scenario generator of the controller is configured to generate the photographing scenario based on an upper limit of a moving speed of the photographing part and an upper limit of a frame rate of the photographing unit.

5. The three-dimensional shape detection device according to claim 4, wherein the condition set in advance comprises any one of a moving range of the photographing part, a photographing pitch of the photographing part, and the plurality of illumination conditions.

6. The three-dimensional shape detection device according to claim 3, wherein the condition set in advance comprises any one of a moving range of the photographing part, a photographing pitch of the photographing part, and the plurality of illumination conditions.

7. The three-dimensional shape detection device according to claim 2, wherein the photographing scenario generator of the controller is configured to generate the photographing scenario based on an upper limit of a moving speed of the photographing part and an upper limit of a frame rate of the photographing unit.

8. The three-dimensional shape detection device according to claim 7, wherein the condition set in advance comprises any one of a moving range of the photographing part, a photographing pitch of the photographing part, and the plurality of illumination conditions.

9. The three-dimensional shape detection device according to claim 2, wherein the condition set in advance comprises any one of a moving range of the photographing part, a photographing pitch of the photographing part, and the plurality of illumination conditions.

10. The three-dimensional shape detection device according to claim 1, wherein the photographing unit comprises a bright-field illumination light and a dark-field illumination light.

11. The three-dimensional shape detection device according to claim 10, wherein the photographing scenario generator of the controller is configured to generate the photographing scenario based on an upper limit of a moving speed of the photographing part and an upper limit of a frame rate of the photographing unit.

12. The three-dimensional shape detection device according to claim 11, wherein the condition set in advance comprises any one of a moving range of the photographing part, a photographing pitch of the photographing part, and the plurality of illumination conditions.

13. The three-dimensional shape detection device according to claim 10, wherein the condition set in advance comprises any one of a moving range of the photographing part, a photographing pitch of the photographing part, and the plurality of illumination conditions.

14. The three-dimensional shape detection device according to claim 1, wherein the photographing scenario generator of the controller is configured to generate the photographing scenario based on an upper limit of a moving speed of the photographing part and an upper limit of a frame rate of the photographing unit.

15. The three-dimensional shape detection device according to claim 14, wherein the condition set in advance comprises any one of a moving range of the photographing part, a photographing pitch of the photographing part, and the plurality of illumination conditions.

16. The three-dimensional shape detection device according to claim 1, wherein the condition set in advance comprises any one of a moving range of the photographing part, a photographing pitch of the photographing part, and the plurality of illumination conditions.

17. The three-dimensional shape detection device according to claim 1, wherein the workpiece comprises an electronic component comprising a bonding wire.

18. A three-dimensional shape detection method comprising:
acquiring, by a photographing part configured to photograph a workpiece with an illumination condition being set to be variable, images of the workpiece having different focal points by relatively approaching and retreating from the workpiece under a plurality of illumination conditions; and
detecting a three-dimensional shape of the workpiece based on the images,
wherein the three-dimensional shape detection method further comprises:
generating a photographing scenario that is a condition for photographing the workpiece based on a condition set in advance;
photographing the workpiece a plurality of times based on the photographing scenario set by switching the illumination condition to each of the plurality of illumination conditions during a one-time relative approach or retreat between the photographing part and the workpiece to acquire a plurality of pieces of image data having different focal points under each of the illumination conditions; and
forming, under each of the illumination conditions, an omnifocal image obtained by evaluating a focus for each local area based on the plurality of pieces of image data having different focal points, which have been acquired through the photographing under the same illumination condition, and performing compositing of the image data from a combination of in-focus local images.

19. The three-dimensional shape detection method according to claim 18, further comprising:
moving a subsequent workpiece to be detected to a detection position and creating an omnifocal image during a period in which the photographing part and the workpiece are being relatively moved in a direction reverse to a direction of the relative approach or retreat.

20. A three-dimensional shape detection program stored on a non-transitory computer readable medium, the three-dimensional shape detection program for causing a photographing part configured to photograph a workpiece with an illumination condition being set to be variable to execute:
acquiring images of the workpiece having different focal points by relatively approaching and retreating from the workpiece under a plurality of illumination conditions; and
detecting a three-dimensional shape of the workpiece based on the images,
wherein the three-dimensional shape detection program comprises the steps of:
generating a photographing scenario that is a condition for photographing the workpiece based on a condition set in advance;
photographing the workpiece a plurality of times based on the photographing scenario set by switching the illumination condition to each of the plurality of illumination conditions during a one-time relative approach or retreat between the photographing part and the workpiece to acquire a plurality of pieces of image data having different focal points under each of the illumination conditions; and
forming, under each of the illumination conditions, an omnifocal image obtained by evaluating a focus for each local area based on the plurality of pieces of image data having different focal points, which have been acquired through the photographing under the same illumination condition, and performing compositing of the image data from a combination of in-focus local images.

* * * * *